(12) United States Patent
Sadler

(10) Patent No.: US 10,294,665 B2
(45) Date of Patent: May 21, 2019

(54) PLANTER-BRICK, FORM FOR PLANTER-BRICK, AND METHOD OF MAKING PLANTER-BRICK

(71) Applicant: Kurt Edward Sadler, Phoenix, AZ (US)

(72) Inventor: Kurt Edward Sadler, Phoenix, AZ (US)

( * ) Notice: Subject to any disclaimer, the term of this patent is extended or adjusted under 35 U.S.C. 154(b) by 0 days.

(21) Appl. No.: 16/104,748

(22) Filed: Aug. 17, 2018

(65) Prior Publication Data

US 2018/0355611 A1 Dec. 13, 2018

Related U.S. Application Data

(63) Continuation of application No. PCT/US2017/018458, filed on Feb. 17, 2017.
(Continued)

(51) Int. Cl.
*B28B 7/16* (2006.01)
*E04C 1/39* (2006.01)
(Continued)

(52) U.S. Cl.
CPC .............. *E04C 1/395* (2013.01); *A01G 9/022* (2013.01); *A01G 9/023* (2013.01); *A01G 9/28* (2018.02);
(Continued)

(58) Field of Classification Search
CPC ......... E02D 29/0266; E04B 2/14; B28B 7/16; B28B 7/162; B28B 7/18; B28B 7/183
(Continued)

(56) References Cited

U.S. PATENT DOCUMENTS 877,874 A * 1/1908 Tsanoff
969,232 A * 9/1910 Winterfield
(Continued)

FOREIGN PATENT DOCUMENTS

CN 101372118 A * 2/2009
DE 3420037 A1 12/1985

OTHER PUBLICATIONS

PCT; International Preliminary Report on Patentability dated Aug. 30, 2018 in the International Application No. PCT/US2017/018458.
(Continued)

*Primary Examiner* — Sunil Singh
(74) *Attorney, Agent, or Firm* — Snell & Wilmer L.L.P.

(57) ABSTRACT

A structural building unit, a form for making a structural building unit, and a method of forming a structure from structural building units are disclosed. A structural building unit comprising left, right, back, and front portions with the front portion extending inward and downward from the left and right front edges creates a void into which soil and plants may be placed, allowing plants to grow from any structure created with the structural building units. These structural building units are suitable for improving the aesthetic value of the structure and providing any structure built therefrom with shade and other methods of cooling, including evapotranspiration, reducing the contribution of the structure to any heat island effect. The plants also lead to improved air quality through conversion of carbon dioxide to oxygen and carbohydrates.

18 Claims, 9 Drawing Sheets

Related U.S. Application Data

(60) Provisional application No. 62/389,186, filed on Feb. 19, 2016.

(51) Int. Cl.
  *B29C 39/02* (2006.01)
  *B29C 39/04* (2006.01)
  *A01G 9/28* (2018.01)
  *A01G 9/02* (2018.01)
  *B28B 7/34* (2006.01)

(52) U.S. Cl.
  CPC .............. *B28B 7/346* (2013.01); *B29C 39/02* (2013.01); *B29C 39/04* (2013.01); *B28B 7/16* (2013.01)

(58) Field of Classification Search
  USPC ........... 425/441; 249/142, 163, 165; 52/606; 264/333
  See application file for complete search history.

(56) References Cited

U.S. PATENT DOCUMENTS

| | | |
|---|---|---|
| 2,514,536 A | 7/1950 | Burney |
| 3,726,042 A | 4/1973 | Haile |
| 5,678,958 A * | 10/1997 | Rossi .................... E02D 29/025 405/284 |
| 5,913,790 A * | 6/1999 | Dawson ................ A01G 9/025 405/286 |
| 2008/0095879 A1 | 4/2008 | Tu |
| 2010/0242390 A1 | 9/2010 | Lee Lum |
| 2012/0126451 A1 | 5/2012 | Owen |

OTHER PUBLICATIONS

International Search Report and Written Opinion dated Jun. 29, 2017 in the PCT Application No. PCT/US 17/ 18458.

* cited by examiner

700

PLANTER-BRICK, FORM FOR PLANTER-BRICK, AND METHOD OF MAKING PLANTER-BRICK

CROSS-REFERENCE TO RELATED APPLICATIONS

This application is a continuation of and claims priority to PCT International Patent Application No. PCT/US17/18458 entitled "PLANTER-BRICK, FORM FOR PLANTER-BRICK, AND METHOD OF MAKING PLANTER-BRICK" and filed Feb. 17, 2017. PCT International Patent Application No. PCT/US17/18458 claims priority to and the benefit of U.S. Provisional Patent Application Ser. No. 62/389,186 entitled "PLANTER-BRICK WALL SYSTEMS" and filed Feb. 19, 2016, the contents of which are hereby incorporated by reference in their entirety.

FIELD

The disclosure generally relates to structural building units, and more particularly, to structural building units out of which plants are able to grow.

BACKGROUND

Concrete and masonry bricks are typically used in building structures. Some of these structures may be walls, used to separate one tract of land from another. Some of these structures may be columns, or raised gardens. Many different types of structures can be built using this type of stackable building unit. However, structures made of this type of building unit may be eyesores, and they may heat up during exposure to the sun throughout the day.

Still, these bricks are commonly used when building structures, and the aesthetic qualities and heating issues are commonly ignored.

In urban areas, these structures are increasingly common, and the heating of the bricks from the sun can add to the urban heat island effect, driving the temperature even higher in the urban areas than the surrounding suburban and rural neighborhoods. These urban heat island areas can increase summertime peak energy demand, air conditioning costs, air pollution and greenhouse gas emissions, heat-related illness and mortality, and water quality. Accordingly, improved systems and methods for facilitating decreased temperatures of brick structures are desirable, as are structures with increased aesthetic value.

SUMMARY

In an example of an embodiment, a structural building unit is a unitary structure comprising a left side portion with a left front edge and a left back edge, a right side portion with a right front edge and a right back edge, a back portion, and a front portion. The front and back portions extend from and perpendicular to the left side portion and the right side portion. The front portion extends inward and downward from the left front edge and the right front edge.

In another example of an embodiment, a form for a structural building unit comprises a front retaining wall assembly having a front extending interior plate, an internal form assembly having an internal extending interior plate, a central retaining wall assembly, a back retaining wall assembly, and a plurality of connectors. The front extending interior plate and the internal extending interior plate form a channel that extends inward and downward from the front retaining wall assembly. The internal form assembly creates an internal void in the structural building unit. The plurality of connectors removably couple each of the assemblies to one another to make a complete form.

In another example of an embodiment, a method of forming a structure out of structural building units comprises assembling a form, filling the form with a structural material, allowing the structural material to harden within the form for a period of time to form the structural building unit, and removing the structural building unit from the form. The form has a front retaining wall assembly having a front extending interior plate, an internal form assembly having an internal extending interior plate, a central retaining wall assembly, a back retaining wall assembly, and a plurality of connectors. The front extending interior plate and the internal extending interior plate form a channel that extends inward and downward from the front retaining wall assembly. The internal form assembly creates an internal void in the resulting structural building unit. The plurality of connectors removably couple each of the assemblies to one another to make a complete form.

The contents of this summary section are intended as a simplified introduction to the disclosure, and are not intended to be used to limit the scope of any claim.

BRIEF DESCRIPTION OF THE DRAWINGS

A more complete understanding of principles of the present disclosure may be derived by referring to the detailed description and claims when considered in connection with the Figures, wherein like reference numbers refer to similar elements throughout the Figures, and where:

Figure 1:
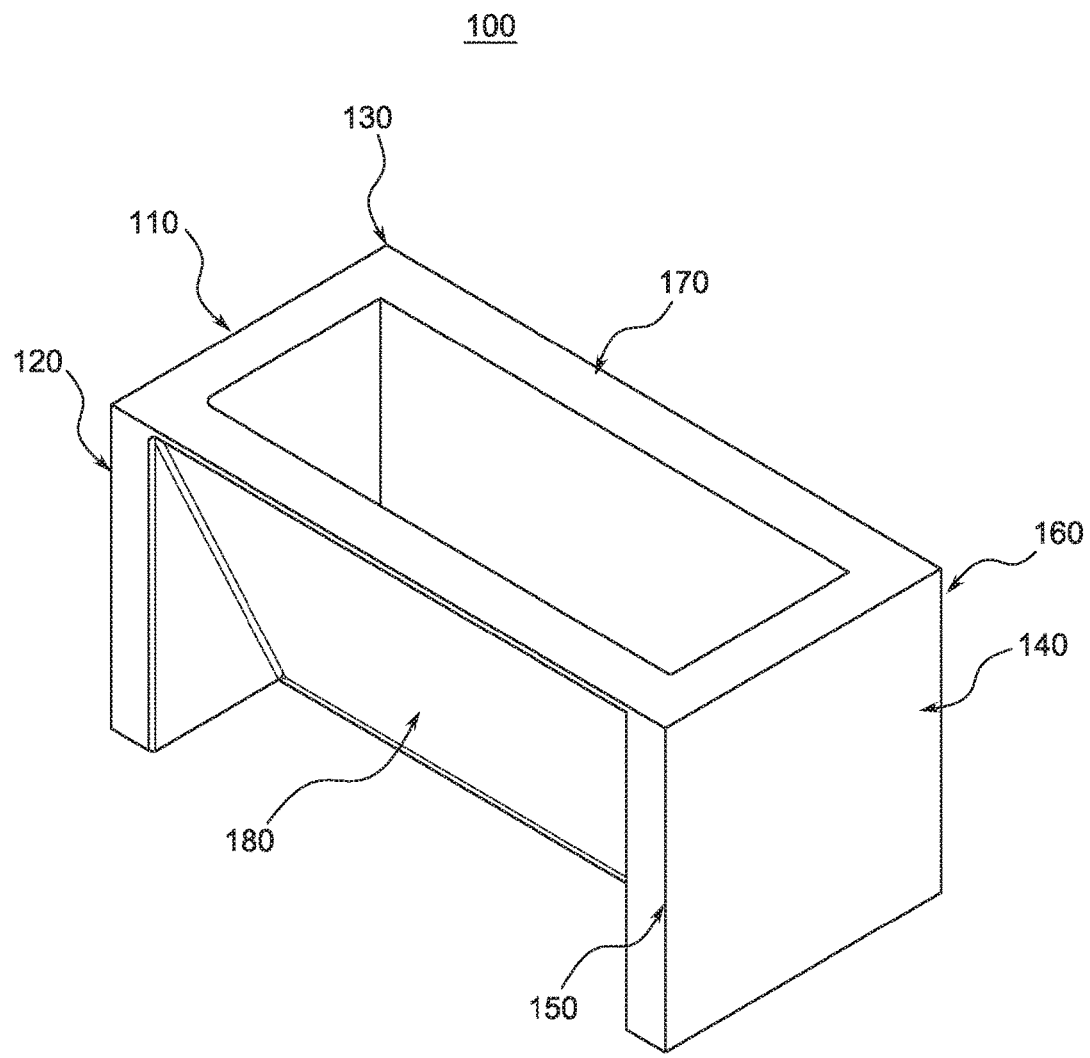
FIG. 1 illustrates an example of a structural building unit, in accordance with various embodiments.

It should be appreciated by one of ordinary skill in the art that, while principles of the present disclosure are described with reference to the figures described above, such principles may also include a variety of embodiments consistent with the description herein. It should also be understood that, where consistent with the description, there may be additional components not shown in the system diagrams, and that such components may be arranged or ordered in different ways.

DETAILED DESCRIPTION

The detailed description shows embodiments by way of illustration, including the best mode. While these embodiments are described in sufficient detail to enable those skilled in the art to practice the principles of the present disclosure, it should be understood that other embodiments may be realized and that logical and mechanical changes may be made without departing from the spirit and scope of principles of the present disclosure. Thus, the detailed description herein is presented for purposes of illustration only and not of limitation. For example, the steps recited in any of the method descriptions may be executed in any order and are not limited to the order presented.

Moreover, for the sake of brevity, certain sub-components of individual components and other aspects of the system may not be described in detail herein. It should be noted that many alternative or additional functional relationships or physical couplings may be present in a practical system. Such functional blocks may be realized by any number of components configured to perform specified functions.

The disclosure includes a structural building unit that has interior openings allowing the bricks to be filled with soil and to grow plants. By building structures with these units, the plants contained within the walls are able to convert carbon dioxide into carbohydrates and water through photosynthesis, reducing the levels of carbon dioxide in the atmosphere and providing a cooling effect. Furthermore, the plants can shade the brick walls and the watering of the structural building units and wet soil can lessen the effects of the summer heating of many cinder block walls, leading to a lessened heat island effect found in urban areas. Using these structural building units can increase the area for planting of plants in urban areas where space is at a minimum. Additionally, the addition of growing plants adds aesthetic beauty to the structures.

In various embodiments, an example of a structural building unit comprises multiple portions, including a left side portion, a right side portion, a back portion, and a front portion. The left side portion also has a left front edge and a left back edge, and the right side portion also has a right front edge and a right back edge. The front portion extends inward and downward from the left and right front edges. The structural building unit may therefore be configured to have a containment vessel that may be filled with soil and plants. The containment vessel may be configured to allow access too, and room for growth of plants in a structural building unit below this structural building unit.

Further, an example of a structural building unit is configured to have an opening in the bottom of the containment vessel. In various embodiments, the front portion extends inward and downward to leave a small opening in the bottom of the containment vessel. Such an opening allows for adequate water drainage, ensuring that plants do not become overwatered and further allows plants room to root within the structure.

With reference now to FIG. 1, in various embodiments, structural building unit 100 comprises left side portion 110 having a left front edge 120 and a left back edge 130, a right side portion 140 having a right front edge 150 and a right back edge 160, a back portion 170, and a front portion 180. The back portion 170 extends perpendicular to the left side portion 110 and perpendicular to the right side portion 140 and extends from the left side portion 110 to the right side portion 140. The front portion 180 also extends perpendicular to the left side portion 110 and the right side portion 140, and the front portion also extends from the left side portion 110 to the right side portion 140. The front portion 180 extends inward and downward from the left front edge 120 and the right front edge 150.

In various embodiments, the back portion 170 may extend inward and downward from the left back edge 130 and the right back edge 160. In various embodiments, the back portion 170 may extend perpendicular to or flush with the left back edge 130 and the right back edge 160. In various embodiments, the front portion 180 may extend inward and downward from the left front edge 120 and the right front edge 150, leaving an opening on the bottom of the structural building unit 100.

In various embodiments, the opening on the bottom of the structural building unit 100 may be a long, rectangular opening. In various embodiments, the opening may be an oval. It is contemplated that the opening may be any shape desired. In various embodiments, the opening may comprise a space between the front portion 180 and the back portion 170 that may be located along a plane at the bottom side of the structural building unit 100 or at some location between the top side and the bottom side of the structural building unit 100.

In various embodiments, the extension of the front portion 180 may not leave an opening at the bottom of the structural building unit 100. In various embodiments, the front portion 180 may contact the back portion 170 at a location on a plane at the bottom side of the structural building unit 100. In various embodiments, the front portion 180 may contact the back portion 170 at some location between the top side and the bottom side of the structural building unit 100.

In various embodiments, there may be holes instead of an opening at the bottom of the structural building unit 100. In various embodiments, the holes may be along the bottom plane of the structural building unit 100. In various embodiments, the holes may be along the front portion 180 near the bottom plane of the structural building unit 100. In various embodiments, the holes may be along the back portion 170 near the bottom of the structural building unit. In various embodiments, the holes may be located in multiple locations, including the front portion 180, the back portion 170 and along the bottom plane of the structural building unit 100. In various embodiments, there may be a single hole. In various embodiments there may be two or more holes. In various embodiments, there may be any number of holes, provided that they do not compromise the structural integrity of the structural building unit 100. In various embodiments, the holes may be small, less than 1 mm. In various embodiments, the holes may be large, with a single hole making up the length and width of the structural building unit 100. In various embodiments the holes may be medium-sized, from about 1 mm in diameter to the length and width of the structural building unit 100. In various embodiments, the holes may be formed during the method of making the structural building unit 100. In various embodiments, the holes may be formed in the porous material of which the structural building unit 100 is made. In various embodiments, the holes may be created after the structural building unit 100 is formed. In various embodiments there may be no openings or holes at all.

The structural building unit 100 may have a length, width, and depth. In various embodiments, the length, width, and depth may be equivalent to those of standard cinder blocks. In various embodiments, the length, width, and depth may be customized to any desired length, width, and depth.

The structural building unit 100 is a unitary structure. In various embodiments, the structural building unit 100 may be made using a form. In various embodiments, the structural building unit 100 may be made by any method known to those in the art. In various embodiments, the structural building unit 100 may be made of any material capable of being cast in a form and cured within said form. In various specific embodiments, the structural building unit 100 may be made of concrete. The structural building unit 100 is made of a structural material. In various embodiments, the structural material may be a mixture of an aggregate and a cement. In various embodiments, the structural material may be a mixture of an aggregate, a cement, and sand. In various embodiments the structural material may be a mixture of an aggregate, cement, sand, and water. In various embodiments, the mixture may comprise equal amounts of all mixture components. In various embodiments, the mixture may comprise more of one component than the other components. In various embodiments, the mixture may comprise more cement and water than sand and aggregate. In various embodiments, the mixture may comprise a 1:1:1:1 ratio of cement, sand, aggregate, and water, respectively. In various embodiments the mixture may comprise a 2:1:1:2 ratio of cement, sand, aggregate, and water, respectively. In various embodiments, the mixture may comprise a 4:3:3:4 ratio of cement, sand, aggregate, and water, respectively. It will be appreciated by those in the art that, in embodiments which use an aggregate-cement mixture to form the structural building unit 100, the structural material may comprise any ratio of components known in the art to be used to make structural building units.

In various specific embodiments, the structural building unit 100 may be made of a cement-vermiculite mixture. In various specific embodiments, it may be made of adobe. In various specific embodiments it may be made of fly ash concrete. In various specific embodiments it may be made of bottom ash concrete. In various specific embodiments it may be made of autoclaved aerated concrete. In various specific embodiments, it may be made of a cement-perlite mixture. In various specific embodiments, it may be made of a cement-pumice mixture. In various specific embodiments, it may be made of a cement-polystyrene mixture. In various specific embodiments, it may be made of plaster. In various specific embodiments, it may be made of plastic. In various specific embodiments, it may be made of clay. In various specific embodiments, it may be made of glass. It will be appreciated by those in the art that the structural building unit 100 may be made out of any material known in the art to be used to make structural building units.

In an example embodiment, a form is disclosed herein for casting structural building units, said form having a front retaining wall assembly, an internal form assembly, a central retaining wall assembly, a back retaining wall assembly, and a plurality of connectors that removably couple the pieces together. In various embodiments, the form may further comprise a customizable piece allowing for personalization of the structural building unit. By creating the form with multiple pieces, it is easier to remove the structural building unit from the form after it has cured without causing damage to the structural building unit. It also allows for a form to be reused.

Figure 2:
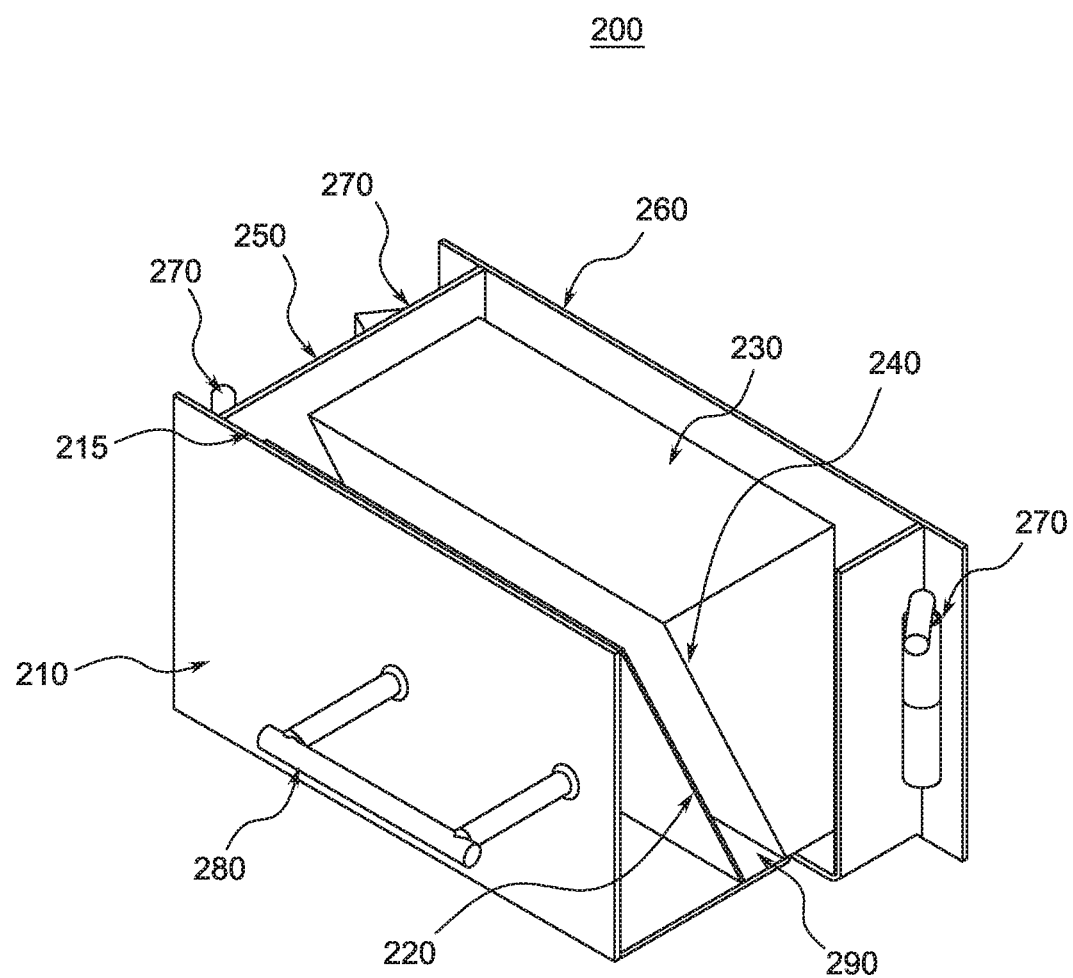
FIG. 2 illustrates an example of a form for making a structural building unit with a cutaway portion to view the interior, in accordance with various embodiments.

With reference now to FIG. 2, in accordance with various embodiments, a form 200 for making structural building units is shown comprising a front retaining wall assembly 210 having a front extending interior plate 220, an internal form assembly 230 having an internal extending interior plate 240, a central retaining wall assembly 250, a back retaining wall assembly 260, and a plurality of connectors 270. In various embodiments, the front retaining wall assembly 210 may further comprise a handle 280.

Figure 3:
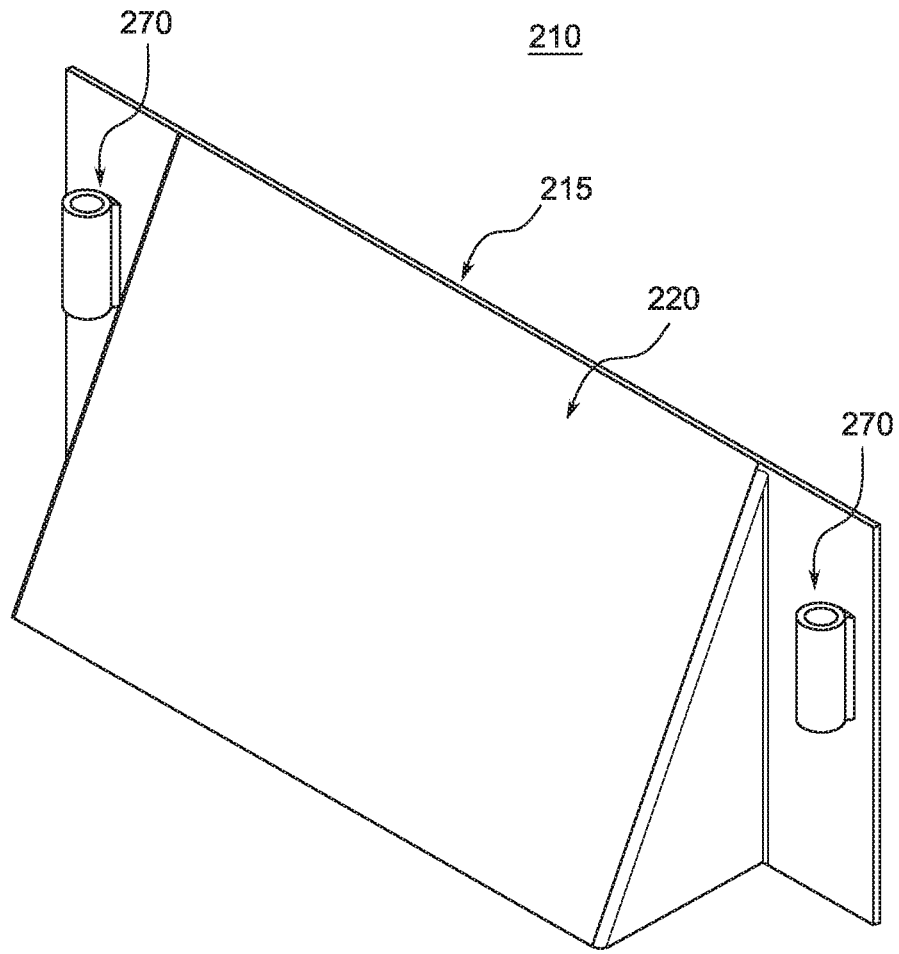
FIG. 3 illustrates an example of a front retaining wall having a front extending interior plate and a plurality of connectors, in accordance with various embodiments.

Turning now to FIG. 3, in various embodiments, a reverse view of the front retaining wall assembly 210 is depicted. In various embodiments, a front retaining wall assembly 210 may be configured with a front extending interior plate 220 extending inward and downward from a front top edge of the front retaining wall assembly 215. In various embodiments the front retaining wall assembly 210 may further comprise a plurality of connectors 270.

Figure 4:
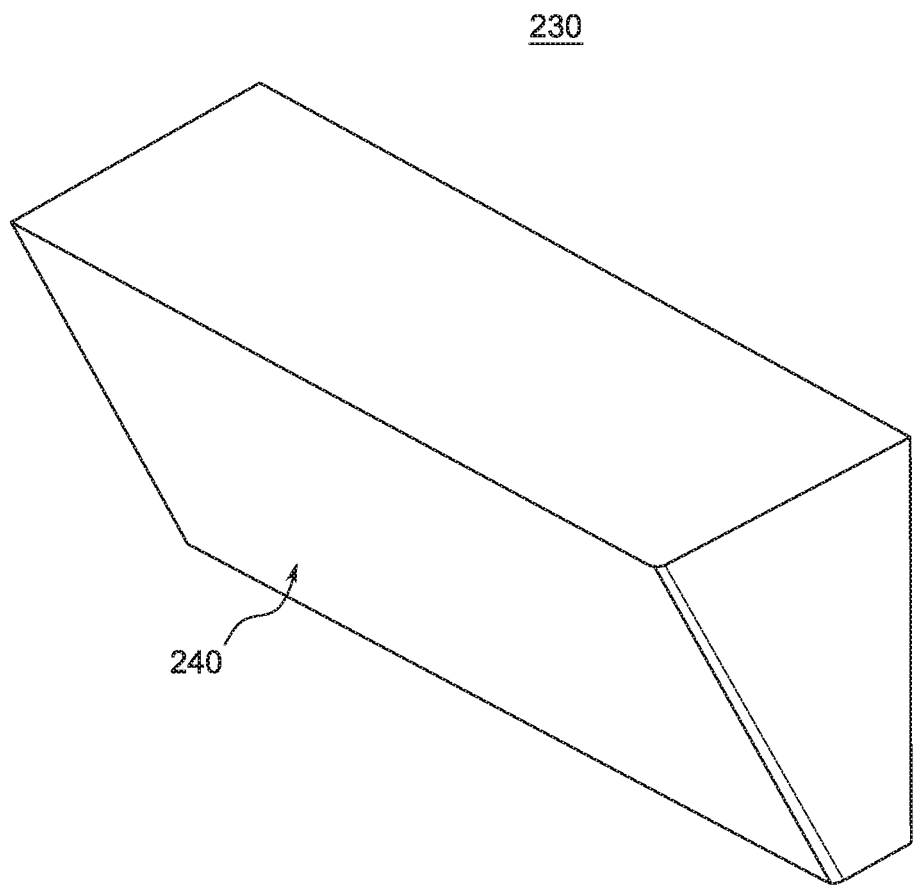
FIG. 4 illustrates an example of an internal form assembly having an internal extending interior plate, in accordance with various embodiments.

FIG. 4 depicts, in various embodiments, an internal form assembly 230 having an internal extending interior plate 240. With momentary reference back to FIG. 2, the internal extending interior plate 240 may extend in such a way so as to create a channel 290 between the front extending interior plate 220 and the internal extending interior plate 240, wherein the channel 290 extends inward and downward from the front retaining wall assembly 210. In various embodiments, the channel 290 forms the front portion 180 of the structural building unit 100. In various embodiments, the internal extending interior plate 240 and the front extending interior plate 220 are parallel to one another. In various embodiments, the channel 290 may be straight or planar. In various embodiments, the channel 290 may be curved. It is contemplated that the channel 290 may be any shape desired, so long as the internal extending interior plate 240 and the front extending interior plate 220 do not contact one another. In various embodiments, the internal form assembly 230 may further comprise a handle to aid in removing the internal form.

Figure 5A:
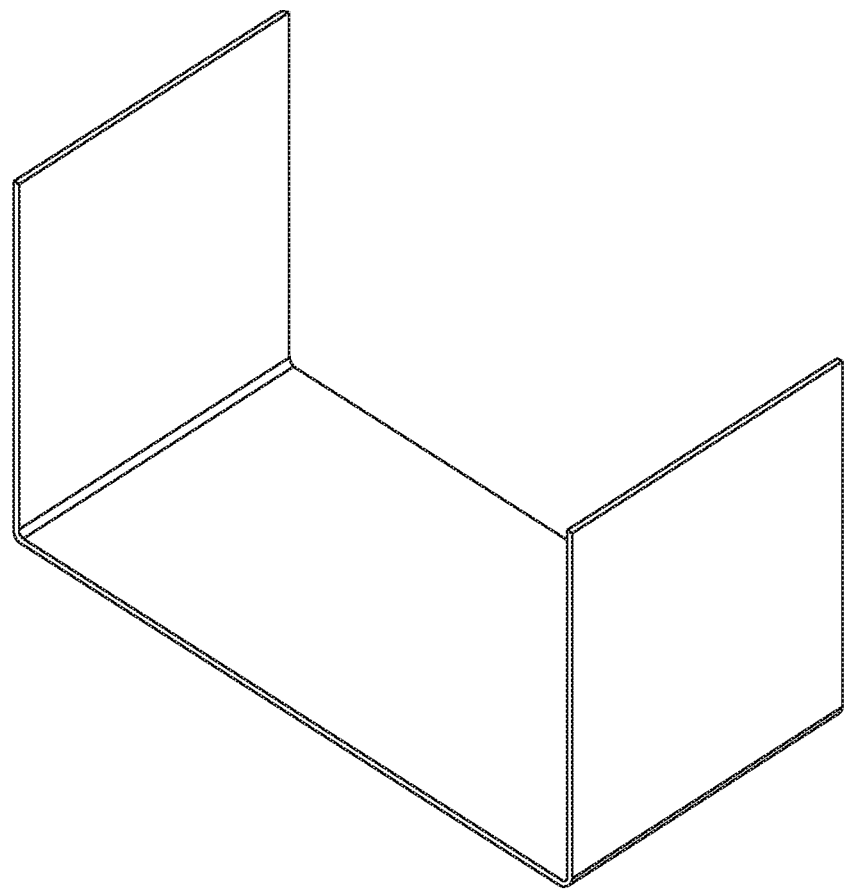
FIG. 5A illustrates an example of a central retaining wall assembly, in accordance with various embodiments.

FIG. 5A depicts an example of a central retaining wall assembly 250, in various embodiments. The central retaining wall assembly 250 creates the bottom and sides of the form.

Figure 5B:
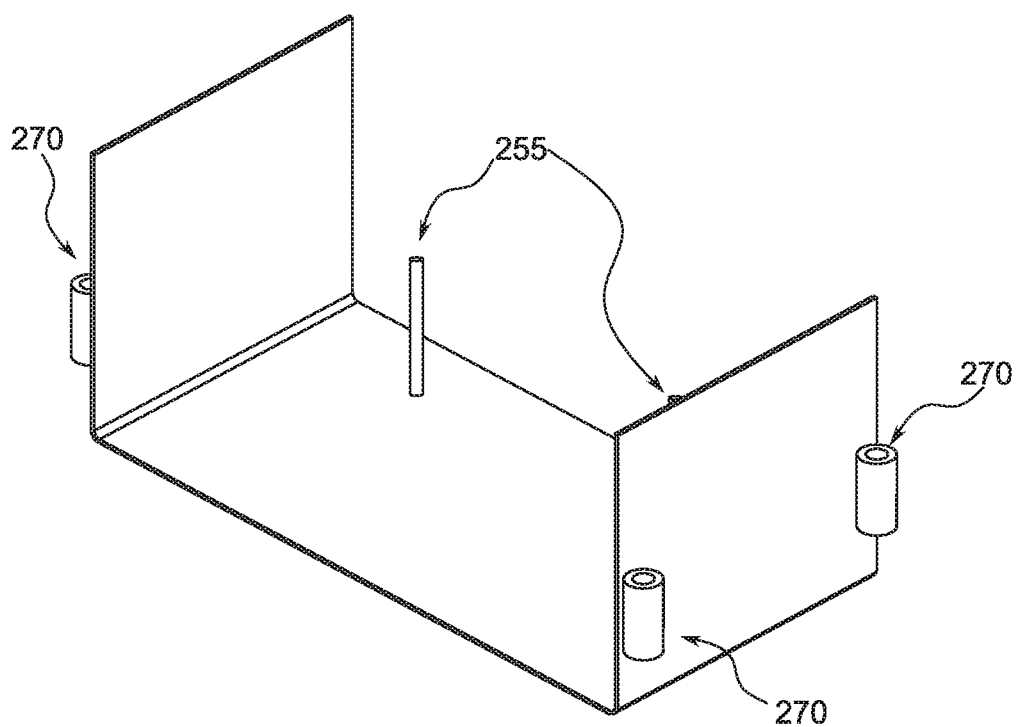
FIG. 5B illustrates an example of a central retaining wall assembly having a guide and a plurality of connectors, in accordance with various embodiments.

Turning to FIG. 5B that depicts an example of a central retaining wall assembly 250 in various embodiments, having a guide 255 and a plurality of connectors 270. In various embodiments, there may be a single guide. In various embodiments, there may be multiple guides. In various embodiments, the guide 255 may fit inside a guide hole in the internal form assembly 230 (not pictured) to provide additional stability to the form.

With momentary reference to FIGS. 1 and 2, the central retaining wall assembly 250 is configured to form the left side portion 110 and the right side portion 140 of the structural building unit 100. The central retaining wall assembly 250 and the internal form assembly 230 do not contact one another, leaving space for the form to create the left and right side portions 110, 140 when the form is filled with structural material. In various embodiments, the space between the central retaining wall assembly 250 and the internal form assembly 230 may be small to create thin left and right side portions 110, 140 in the structural building unit. In various embodiments, the space between the central retaining wall assembly 250 and the internal form assembly 230 may be large, creating thick left and right side portions 110, 140 in the structural building unit. In various embodiments, the central retaining wall assembly 250 and the internal form assembly 230 may create left and right side portions 110, 140 that have the same thickness. In various embodiments, the central retaining wall assembly 250 and the internal form assembly 230 may create a left side portion 110 that is thicker than the right side portion 140. In various embodiments, the central retaining wall assembly 250 and the internal form assembly 230 may create a right side portion 140 that is thicker than the left side portion 110.

Figure 6:
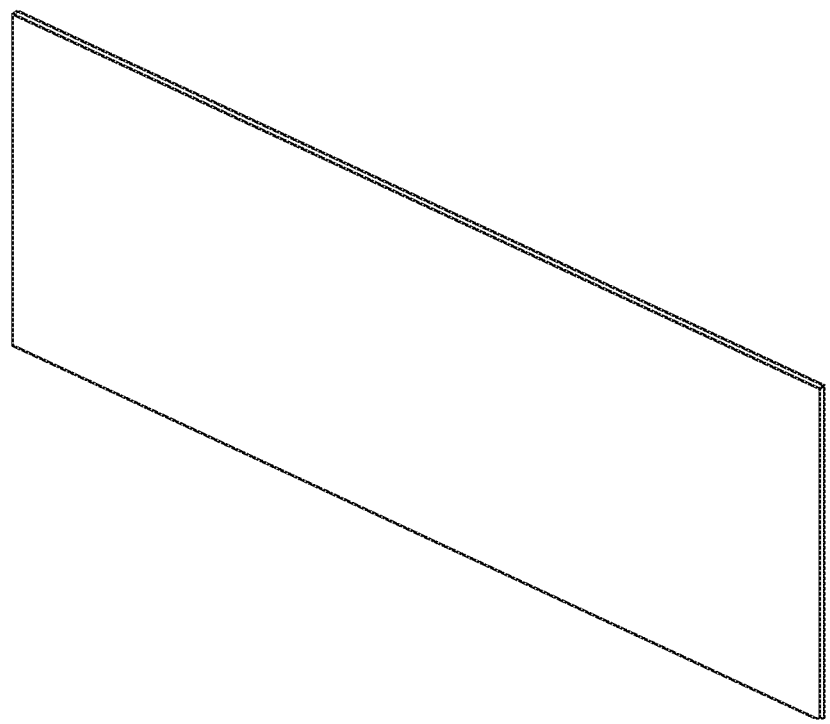
FIG. 6 illustrates an example of a back retaining wall assembly, in accordance with various embodiments.

With reference now to FIG. 6, in various embodiments, a back retaining wall assembly 260 may also be included. The back retaining wall assembly 260 creates the back side of the form. With momentary reference to FIGS. 1 and 2, the back retaining wall assembly 260 and the internal form assembly 230 do not contact one another, leaving space for the form to create the back portion 170 when the form is filled with structural material. In various embodiments, the space between the back retaining wall assembly 260 and the internal form assembly 230 may be small to create a thin back portion 170. In various embodiments, the space between the back retaining wall assembly 260 and the internal form assembly 230 may be large to create a thick back portion 170. In various embodiments, the space between the back retaining wall assembly 260 and the internal form assembly 230 may create a back portion 170 that is similar in thickness to the right and left side portions 110, 140. In various embodiments, the space between the back retaining wall assembly 260 and the internal form assembly 230 may create a back portion 170 that is thinner than the right and left side portions 110, 140. In various embodiments, the space between the back retaining wall assembly 260 and the internal form assembly 230 may create a back portion 170 that is thicker than the right and left side portions 110, 140.

Although one specific form is disclosed herein, any other combination that creates the structural building unit described herein is contemplated. Any form that is filled with structural material that cures into a single, unitary component conforming with the description of the structural building unit described herein is contemplated.

In accordance with various embodiments, a plurality of connectors 270 may be used throughout the form to removably couple individual assemblies to one another. This allows the form to be removed from the final structural building unit after it has cured without risking damage to the structural building unit or the form. In various embodiments, the connectors 270 may comprise clips. In various embodiments the connectors 270 may comprise pin locks. In various embodiments the connectors 270 may comprise the coupling of a pin and a pin receiver. The connectors 270 may be any mechanism known in the art to be capable of removably coupling the assemblies together.

The form 200 may be utilized for creating structural building units out of a structural material. The form 200 may be made from a material that is non-porous, non-reactive with the structural material, and rigid. In various embodiments, the form 200 may be made from metal. In various embodiments the form 200 may be made from fiberglass. In various embodiments the form 200 may be made from plastic. In various embodiments the form 200 may be made from plaster. In various embodiments the form 200 may be made from polyurethane rubber. In various embodiments the form 200 may be made from rigid foam. In various embodiments the form 200 may be made from any material known in the art to be suitable for creating a form for structural building units.

In various embodiments, a removal agent may be used on the interior surfaces of the form 200 to aid in removing the cured structural building unit 100 from the form 200. In various embodiments, the removal agent may be vegetable oil. In various embodiments, the removal agent may be a commercial release agent. In various embodiments, the removal agent may be heavy paper. In various embodiments, the removal agent may be rosin paper. In various embodiments, the removal agent may be a heavy mill plastic. In various embodiments, the removal agent may be a motor oil. In various embodiments, the removal agent may be a motor oil and kerosene mixture. In various embodiments, no removal agent may be used. It will be appreciated that any removal agent known in the art may be used to aid in the removal of the structural building unit 100 from the form 200.

A method of forming a structure out of which plants are able to grow is also disclosed herein. The form 200 may be assembled and filled with a structural material. The structural material may be allowed to harden within the form for a period of time to form a structural building unit, and then the unit may be removed from the form. In various embodiments, the structural building unit may be removed from the form by using the connectors 270 that removably couple the individual assemblies of the form to one another. In various embodiments, the structural building unit may be filled with soil. In various embodiments, the structural building unit may be filled with soil and seeds and/or live plants.

In various embodiments, the structural building units may be stacked to form a structure. In various embodiments, the structure may be composed solely of structural building units. In various embodiments, the structure may be composed of a mixture of structural building units and typical building blocks known in the art. In various embodiments, two structural building units may be stacked on top of one another. In various embodiments, two structural units may be placed back to back. In various embodiments, a row of structural building units may be incorporated into a structure made of typical building blocks. In various embodiments, structural building units may be incorporated at random into a structure made of typical building blocks. In various embodiments, structural building units may be incorporated into a structure made of typical building blocks at regular intervals. In various embodiments, structural building units may be incorporated into a structure made out of typical building blocks so as to form a desired design. In various embodiments, structural building units may be incorporated into multiple sides of a structure made of typical building blocks. In various embodiments, a structure may be made entirely of structural building units, at least two units thick. In various embodiments, a row of structural building units may be added on top of a pre-existing structure. In various embodiments, the structural building unit may be configured to have plants growing out of both the front portion and the back portion.

Figure 7:
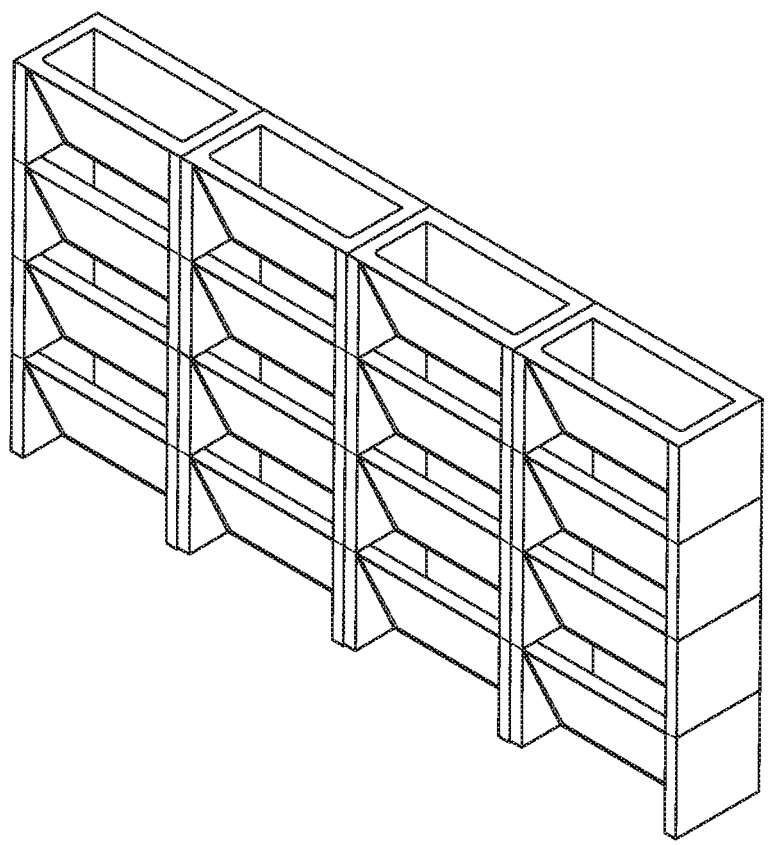
FIG. 7 illustrates an example of a structure constructed using multiple structural building units, in accordance with various embodiments.
Figure 8:
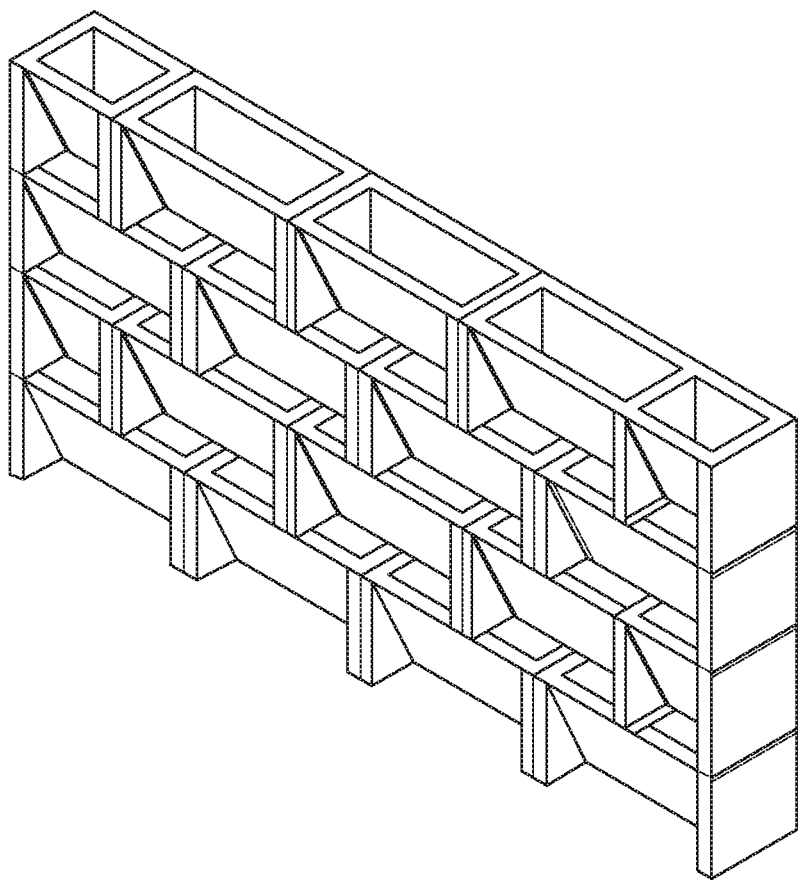
FIG. 8 illustrates an example of a structure constructed using multiple structural building units with rows offset from one another, in accordance with various embodiments.

In various embodiments, the structure may be a wall 700, 800, as depicted in FIGS. 7 & 8. In various embodiments, the structure may be a column. In various embodiments the planter-bricks may be laid in the same standard layered pattern of typical brick walls. In various embodiments the structure may be a single unit planter. In various embodiments, the structure may be used to enclose a space. In various embodiments, structural building units may be used in water fountains. In various embodiments the structure may be used to create a raised garden. In various embodiments, the structure may be a glass-topped table. It is contemplated that any structure built using individual units may be built using the structural building unit disclosed herein. It is further contemplated that any structure may be constructed using one or more of the various embodiments described herein.

In various embodiments, a structural building unit may require watering. In various embodiments, a structural building unit may be watered at the top in the containment vessel. In various embodiments, a structural building unit may be watered by gravity, having water fall into the structural building unit from a structural building unit placed higher up. In various embodiments, a structural building unit may be watered individually. It is contemplated that a structural building unit may be watered by any method known in the art, including by rain, by hose, by irrigation system, and by watering can. Nothing indicated herein should be interpreted to limit the method by which a structural unit may be watered.

While the steps outlined herein represent embodiments of principles of the present disclosure, practitioners will appreciate that there are a variety of physical structures and interrelated components that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Examples of systems and methods are disclosed. In the detailed description herein, references to "various embodiments", "one embodiment", "an embodiment", "an example of an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A form for casting a structural building unit out of which plants are able to grow, comprising:
   a front retaining wall assembly having a front extending interior plate;
   an internal form assembly having an internal extending interior plate and an internal form back plate;
   a central retaining wall assembly having a bottom wall, a left side wall, and a right side wall;
   a back retaining wall assembly; and
   a plurality of connectors;
   wherein the front extending interior plate and the internal extending interior plate form a front channel when the form is assembled, and wherein the front channel extends inward and downward from the front retaining wall assembly for casting a front portion of the structural building unit;
   wherein the back retaining wall assembly and the internal form back plate form a back channel when the form is assembled for casting a back portion of the structural building unit, wherein the back portion is vertically oriented;
   wherein the left side wall and the internal form assembly form a left side channel when the form is assembled for casting a left side portion of the structural building unit and the right side wall and the internal form assembly form a right side channel when the form is assembled for casting a right side portion;
   wherein the bottom wall of the central retaining wall assembly is configured to provide a bottom surface for the cast structural building unit;
   wherein the internal form assembly creates an internal void in the structural building unit;
   wherein the plurality of connectors removably couple each of the front retaining wall assembly, the internal form assembly, the central retaining wall assembly, and the back retaining wall assembly to one or more of the front retaining wall assembly, the internal form assembly, the central retaining wall assembly, and the back retaining wall assembly, and
   wherein the form is configured to cast the structural building unit to have the back portion extend from the left side portion to the right side portion, the front portion extend perpendicular to the left side portion and the right side portion, the front portion extend from the left side portion to the right side portion, and the front portion start from a front top edge of the structural building unit and form a portion of a top surface of the structural building unit and extend inward and downward to the bottom surface of the structural building unit, and the front portion form a portion of the bottom surface of the structural building unit.

2. The form of claim 1, the internal form assembly further comprising at least one guide hole and the central retaining wall assembly further comprising at least one guide, wherein the guide fits into the guide hole.

3. The form of claim 1, wherein the plurality of connectors comprise pin locks.

4. The form of claim 1, wherein the form can be filled with a structural material.

5. The form of claim 4, wherein the form is made from a material that is non-porous, non-reactive with the structural material, and rigid.

6. The form of claim 5, wherein the material is selected from the group consisting of metal, fiberglass, plastic, plaster, polyurethane rubber, and rigid foam.

7. The form of claim 1, wherein the extending interior plate and the internal extending interior plate are parallel to one another.

8. The form of claim 1, wherein the form is configured to cast the left side portion to have a left front edge and a left back edge, and the right side portion to have a right front edge and a right back edge;
   wherein the back portion extends perpendicular to the left back edge and the right back edge.

9. The form of claim 8, wherein the relative spacing of the front retaining wall assembly, the internal form assembly, and the back retaining wall assembly create the structural building unit having the front portion extending inward and downward from the left front edge and the right front edge leaving an opening between the front portion and the back portion.

10. The form of claim 8, wherein the relative spacing of the front retaining wall assembly, the internal form assembly, and the back retaining wall assembly create the structural building unit having the front portion extending inward and downward from the left front edge and the right front edge and contacting the back portion.

11. The form of claim 8, wherein the form is configured to cast the structural building unit to be stackable on top of other structural building units.

12. The form of claim 8, wherein the form is configured to cast the structural building unit to have a length, a width, and a depth equivalent to those of standard cinder blocks.

13. The form of claim 8, wherein the form is configured for casting the structural building unit of a structural material, in the form, and for curing the structural building unit within said form.

14. The form of claim 13, wherein the structural material is selected from the group consisting of concrete, cement-vermiculite mixture, cement-perlite mixture, cement-pumice mixture, cement-polystyrene mixture, adobe, fly ash concrete, bottom ash concrete, autoclaved aerated concrete, plaster, clay, plastic, and glass.

15. The form of claim 13, wherein the central retaining wall assembly and the internal form assembly are configured to cast the structural building unit to create the left side portion, the right side portion, the back portion and the front portion with a similar thickness.

16. A method of forming a structure out of which plants are able to grow, comprising:
   assembling the form of claim 1;
   filling the form with a structural material;
   allowing the structural material to harden within the form for a period of time to form the structural building unit; and
   removing the structural building unit from the form.

17. The method of claim 16, further comprising filling the internal void in the structural building unit with a soil and at least one plant selected from the group of seeds and live plants.

18. The method of claim 16, further comprising stacking multiple structural building units in a desired pattern to form the structure.

* * * * *